United States Patent
Farmer et al.

(10) Patent No.: US 11,799,933 B1
(45) Date of Patent: *Oct. 24, 2023

(54) SYSTEMS AND METHODS FOR DATA PRE-FETCHING

(71) Applicant: United Services Automobile Association (USAA), San Antonio, TX (US)

(72) Inventors: William Daniel Farmer, Carrollton, TX (US); Pooja Krishnaswamy, Cedar Park, TX (US); Victor Kwak, Frisco, TX (US); Michael Lebowitz, McKinney, TX (US); Justin Nash, Little Elm, TX (US); Huihui Wu, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,523

(22) Filed: Jun. 20, 2022

Related U.S. Application Data

(63) Continuation of application No. 17/032,854, filed on Sep. 25, 2020, now Pat. No. 11,405,441.

(60) Provisional application No. 62/906,412, filed on Sep. 26, 2019.

(51) Int. Cl.
*H04L 65/612* (2022.01)
*H04L 65/75* (2022.01)
*H04B 7/0413* (2017.01)
*H04L 65/65* (2022.01)

(52) U.S. Cl.
CPC ......... *H04L 65/612* (2022.05); *H04B 7/0413* (2013.01); *H04L 65/65* (2022.05); *H04L 65/765* (2022.05)

(58) Field of Classification Search
CPC ..... H04L 65/612; H04L 65/765; H04L 65/65; H04B 7/0413
See application file for complete search history.

(56) References Cited

U.S. PATENT DOCUMENTS

| | | | |
|---|---|---|---|
| 6,721,572 B1* | 4/2004 | Smith | H04W 76/19 370/328 |
| 8,103,441 B2* | 1/2012 | Callaghan | H04L 67/52 701/457 |
| 8,160,616 B2* | 4/2012 | Jain | H04W 4/029 455/414.1 |
| 9,295,022 B2* | 3/2016 | Bevan | H04W 52/283 |
| 10,044,817 B2* | 8/2018 | Vuyyuru | H04W 4/50 |
| 10,630,803 B2* | 4/2020 | Hwang | H04L 67/5681 |
| 10,798,755 B2* | 10/2020 | Subramanian | H04W 72/044 |
| 10,820,263 B1* | 10/2020 | Barton | H04W 48/20 |

(Continued)

*Primary Examiner* — Nazia Naoreen
(74) *Attorney, Agent, or Firm* — Fletcher Yoder, P.C.

(57) ABSTRACT

System and methods for pre-fetching data are provided. In one embodiment, an electronic device includes communications circuitry communicatively coupled to a data provider system over a network to obtain streaming data for completion of tasks. The electronic device also includes pre-fetch circuitry that identifies a dead zone in the network; calculates a pre-fetch data size amount based at least in part upon a size of the dead zone; and requests the pre-fetch data size amount of the data, to mitigate lost streaming ability in the dead zone.

20 Claims, 4 Drawing Sheets

(56) References Cited

U.S. PATENT DOCUMENTS

| | | | |
|---|---|---|---|
| 2016/0025497 A1* | 1/2016 | Baalu .................. | G01C 21/005 701/461 |
| 2016/0031459 A1* | 2/2016 | Murren ................ | B61L 25/025 701/22 |
| 2020/0213384 A1* | 7/2020 | Rasool ................. | H04L 65/612 |

* cited by examiner

SYSTEMS AND METHODS FOR DATA PRE-FETCHING

This application claims the benefit of U.S. patent application Ser. No. 17/032,854, entitled "SYSTEMS AND METHODS FOR DATA PRE-FETCHING," filed Sep. 25, 2020, which claims the benefit of U.S. Provisional Patent Application No. 62/906,412, entitled "SYSTEMS AND METHODS FOR DATA PRE-FETCHING," filed Sep. 26, 2019, each of which is incorporated herein by reference in its entirety for all purposes.

BACKGROUND

The present disclosure relates generally to techniques for pre-fetching data.

Computing systems are becoming increasingly dependent on streaming data provision. Unfortunately, network dead zones (e.g., areas where data streaming may not be supported by a computer network) may cause malfunctioning of these streaming-dependent devices.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward dynamic data pre-fetching of data to mitigate network dead zones. As will be discussed in more detail below, data pre-fetching may be optimized based upon network boundaries. In some embodiments, the size of data downloaded for such pre-fetching may be dynamically altered based upon a known dead zone size.

Figure 1:
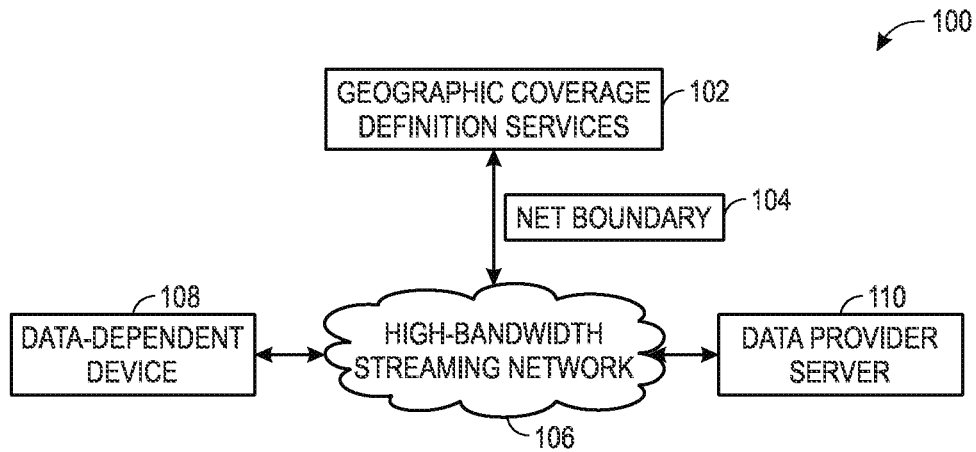
FIG. 1 is a schematic block diagram, illustrating a system for determining dead zones, in accordance with an embodiment of the present disclosure.

FIG. 1 is a schematic block diagram, illustrating a system 100 for determining dead zones, in accordance with an embodiment of the present disclosure. The system 100 includes geographic coverage definition services 102, which provide network boundaries 104 for a high-bandwidth streaming network 106. The network boundaries 104 may indicate where particular network dead zones are, the size of the network dead zones, etc. The network boundaries 104 may be identified in a number of manners. In some embodiments, as electronic devices exit a dead zone and re-enter the network 106, an indication may be provided from these devices, indicating that the electronic device experienced a dead zone in the network. In some instances, this indication may be provided only when the electronic device did not receive a prior indication of the dead zone/network boundary, indicating that the geographic coverage definition services 102 may not be aware of the dead zone. This type of dead zone reporting may be increasingly beneficial as network transmitters/receivers become increasingly mobile, easily moving from location to location, causing varied dead zone locations.

The network boundaries may be provided to a data-dependent electronic device 108, which streams data from data provider server 110. By becoming aware of the network boundaries 104, the data-dependent electronic device 108 can pre-fetch necessary data prior to reaching the network boundaries 104. For example, navigation maps streamed to a navigation unit can be pre-fetched prior to the navigation unit entering a dead zone.

Figure 2:
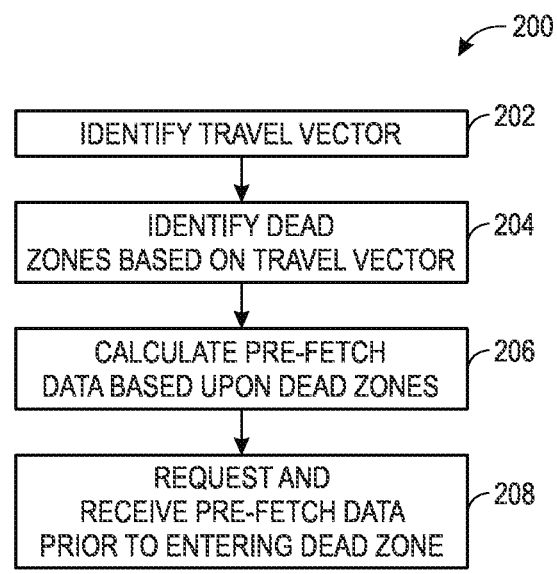
FIG. 2 is a flowchart, illustrating a process for pre-fetching data to mitigate the loss of streaming availability in dead zones, in accordance with an embodiment of the present disclosure.

Pre-fetching data may enable an electronic device to continue to utilize streaming data, even when a dead zone disables an ability for the electronic device to obtain new streaming data from the data provision services. FIG. 2 is a flowchart, illustrating a process 200 for pre-fetching data to mitigate the loss of streaming availability in dead zones, in accordance with an embodiment of the present disclosure.

The process 200 begins by identifying one or more travel vectors of a data-dependent electronic device. For example, the travel vectors may be identified based upon changing global positioning system (GPS) coordinates of the data-dependent electronic device. In some embodiments, a planned route of a navigation unit may provide an indication of the travel vector. As will be discussed in more detail below, in some instances, the travel vector may be identified based upon a current location of the data-dependent electronic device.

Once the travel vector is identified, the dead zones associated with the travel vector may be identified (block 204). For example, the data-dependent electronic device may query the geographic coverage definition services for network boundaries associated with the travel vector.

Once the dead zones are identified, a determination may be made as to whether pre-fetching should be implemented. For example, when no dead zones are identified, pre-fetching may not be needed. When dead zones are identified, data can be pre-fetched for use in the dead zones.

Accordingly, the data to pre-fetch is calculated based upon the identified dead zones (block 206). The data to pre-fetch can be determined based currently streaming data. For example, if map data is currently being streamed, mapping data can be pre-fetched.

An amount of data to pre-fetch may be calculated based upon the type of data being streamed. For some streaming content, an amount of streaming data used may be independent of an amount of time spent within a dead zone. For example, an amount of mapping data used in a dead zone may depend primarily on being within the dead zone rather than an amount of time spent within the dead zone. For dead-zone-duration-independent streaming content, the amount of data to pre-fetch may be based upon the size of the dead zone. For example, for mapping data, the pre-fetched data may depend on the size and shape of the dead zone, rather than a duration within the dead zone.

In contrast, an amount of other streaming content, such as digital media (e.g., movies and/or audio content), used in a dead zone may depend on an amount of time within the dead zone. Accordingly, the amount of data to pre-fetch for these varying types of streaming content may be calculated differently. To calculate an amount of data to pre-fetch for dead-zone-duration-dependent streaming content, a rate of consumption of such content may be calculated. For some data, this may be calculated by identifying a playback speed of content. For other data, a historic average data utilization over a period of time may be calculated and used as an indication of the rate of consumption. The rate of consumption may be applied (e.g., multiplied by) the expected duration in the dead zone, resulting in an amount of data to pre-fetch. In some embodiments, an additional buffer may be added on to this amount to help ensure that there is enough pre-fetched data to fulfill data requests within the dead zone.

Figure 3:
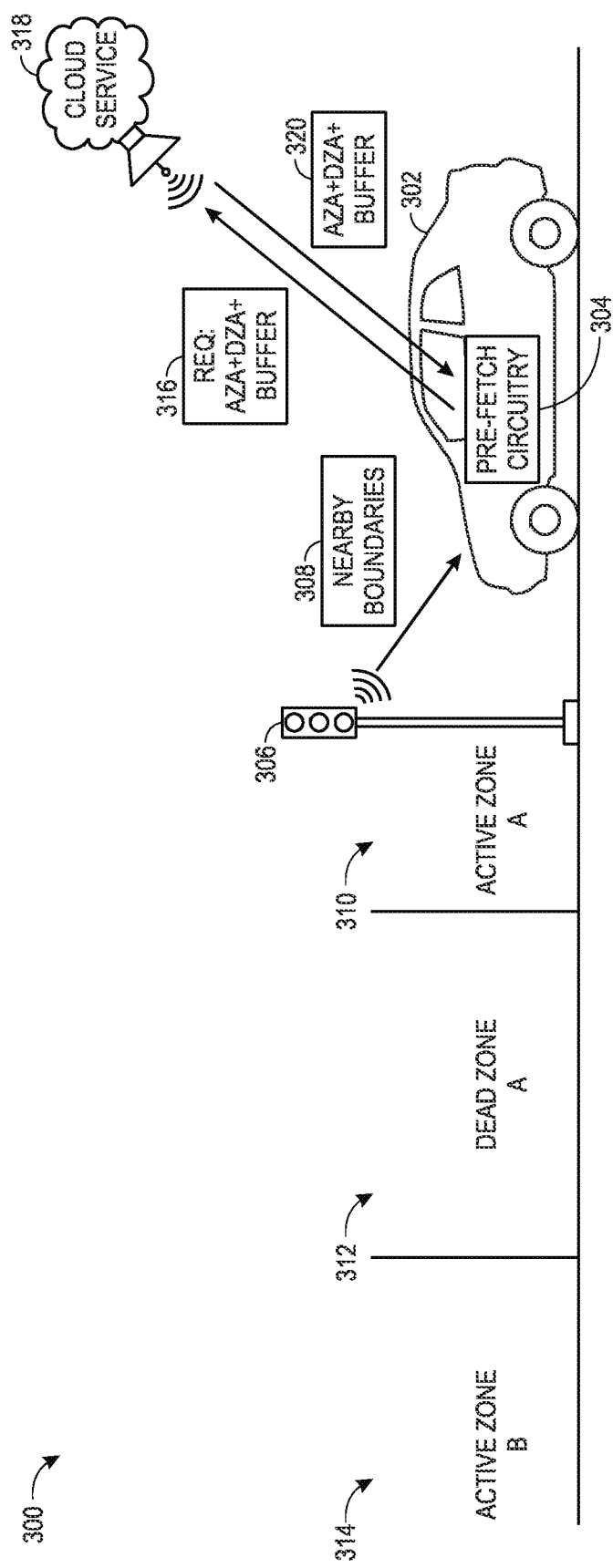
FIG. 3 is a schematic diagram, illustrating a pre-fetch enabled vehicle, in accordance with an embodiment of the present disclosure.

FIG. 3 is a schematic diagram, illustrating a system 300 to facilitate a pre-fetch enabled vehicle 302, in accordance with an embodiment of the present disclosure. As illustrated, the vehicle 302 is equipped with pre-fetch circuitry 304, which is used to determine when to pre-fetch data, what data to pre-fetch, and how much data to pre-fetch.

In the current embodiment, a beacon 306 (here disposed in a traffic light) provides an indication of nearby boundaries 308 associated with the traffic light. The beacon 306 may provide the nearby boundaries 308. The nearby boundaries 308 may identify active zones, dead zones, or both. For example, in the depicted embodiment, the nearby boundaries 308 may identify Active Zone A 310, Dead Zone A 312, and/or Active Zone B 314.

Figure 5:
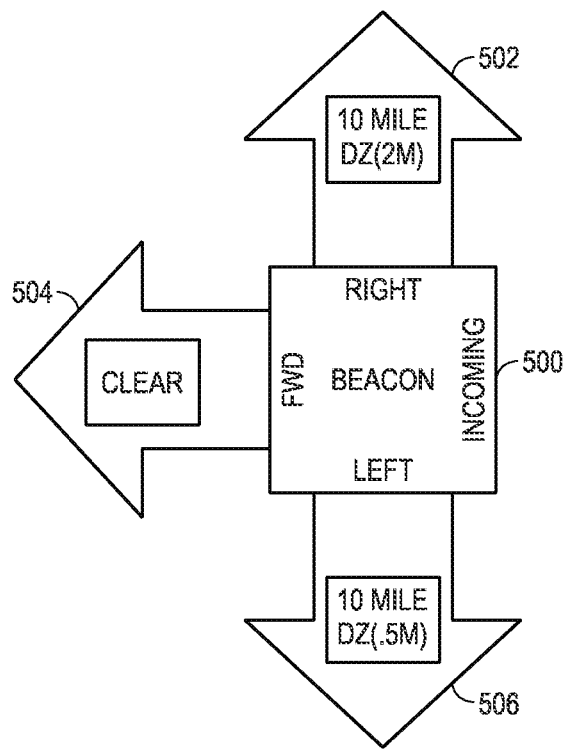
FIG. 5 is a schematic diagram, illustrating a multi-directional beacon that provides a dead zone size, in accordance with an embodiment of the present disclosure.

FIG. 5 is a schematic diagram, illustrating an example beacon 306, here a multi-directional beacon 500 that provides dead zone indications for several possible directional vectors, in accordance with an embodiment of the present disclosure. As illustrated, the multi-directional beacon 500 provides a digital broadcast providing an indication 502 that a 10 mile dead zone will be experienced to the right in 2 miles. Further, the multi-directional beacon 500 broadcasts a digital indication 504 that indicates that there are no nearby dead zones for devices that continue forward. The multi-directional beacon 500 provides an indication 506 that devices travelling left will experience a 1 mile dead zone in 0.5 miles.

While the depicted embodiment illustrates one type of dead zone indication other indication types could be provided. For example, in some embodiments, coordinates indicating a geographical location, size, and/or shape of dead zone may be provided.

Returning to FIG. 3, based upon the nearby boundaries 308, the pre-fetch circuitry 304 may request the active zone data, the dead zone data, and, in some embodiments, an added data buffer. As illustrated in FIG. 3, the pre-fetch circuitry 304 provides a request 316 to a data provider cloud services 318 for Active Zone A 310 data, Dead Zone A 312 data, and buffer data. The data buffer may mitigate extended periods within the dead zones.

The data provider cloud services 318 may return the requested data 320 prior to entering the Dead Zone A 312. Accordingly, the vehicle 302 may continue to access streaming data even while in the Dead Zone B 314.

Figure 4:
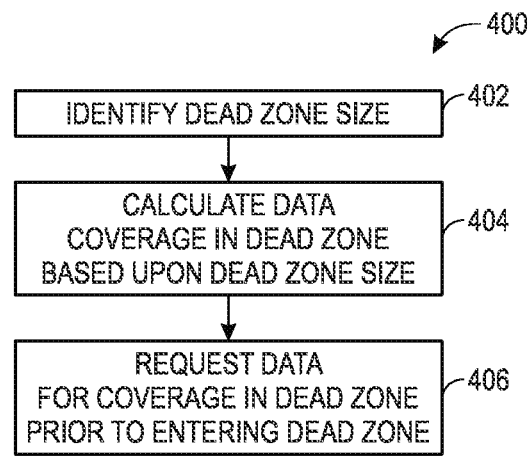
FIG. 4 is a flowchart, illustrating a process for determining an amount of data to pre-fetch, in accordance with an embodiment of the present disclosure.

FIG. 4 is a flowchart, illustrating a process 400 for requesting an amount of data to pre-fetch, in accordance with an embodiment of the present disclosure. The process 400 begins by identifying the dead zone size for a dead zone that a data stream dependent device will be travelling through (block 402). As previously discussed, network boundaries may define dead zones. The sizes and shapes of the dead zones may be calculated from these network boundaries.

Next, an amount of data to request is determined, based at least in part upon the dead zone size (block 404). As will be described in more detail in FIG. 7, the amount of data may be dependent upon a number of factors, such as whether the data is of a type that is dead zone duration dependent and what the rate of consumption of the data is. Further the amount of data requested can depend on whether a data buffer is needed and the size of the data buffer, in the event that such a data buffer is needed.

Once the data for coverage in the dead zone is calculated, the data for coverage in the dead zone is requested prior to entering the dead zone (block 406). As may be appreciated, the data should be received prior to entering the dead zone, as well. Accordingly, in some embodiments, the pre-fetch circuitry 304 may determine an amount of data that can be pre-fetched prior to entering the dead zone. This may be done by identifying an expected time to entering the dead zone, based up the current rate of travel and distance to the dead zone.

Figure 6:
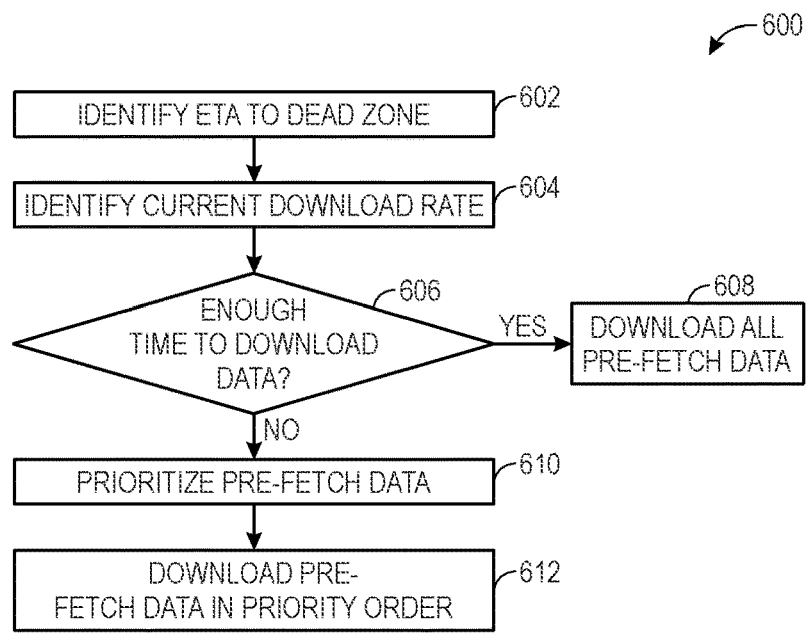
FIG. 6 is a flowchart, illustrating a process for downloading pre-fetch content prior to entering a dead zone, in accordance with an embodiment of the present disclosure.

Turning now to a discussion of ensuring data is pre-fetched prior to entering a dead zone, FIG. 6 is a flowchart, illustrating a process 600 for downloading pre-fetch content prior to entering a dead zone, in accordance with an embodiment of the present disclosure. The process 600 includes identifying an estimated time of arrival (ETA) to a dead zone (block 602). The ETA can be calculated by identifying a distance between the streaming data dependent electronic device and the start of the dead zone. This distance can be applied to a rate of travel of the streaming data dependent electronic device toward the start of the dead zone. This results in an ETA to the start of the dead zone.

Additionally, available bandwidth/download rates may vary from time to time. Accordingly, a current available download rate may be identified (block 604). This may be done, for example, by initiating a test download and observing the speed that the test download performs at.

Based upon the ETA and the current download rate, a determination may be as to whether there is enough time to download the determined amount of pre-fetch data (decision block 606). This may be done by applying the available download rate to the size of the desired pre-fetch data, resulting in an amount of time needed to download the desired pre-fetch data. If the amount of time is less than the amount of time to the ETA, then there is enough time to download the pre-fetch data. Accordingly, in such a scenario, all of the pre-fetch data is downloaded (block 608).

However, in scenarios where there is not enough time to download all of the pre-fetch data, additional mitigation steps may be performed. For example, as illustrated in FIG. 6, the pre-fetch data can be prioritized (block 610). Prioritization may be based upon a number of factors. In one embodiment, relatively more essential data (e.g., data associated more closely with completing the electronic device's tasks) may be prioritized higher than relatively less essential data. For example, mapping data may be more essential to driving a vehicle than music data for music playing in the vehicle. Thus, the mapping data may be prioritized over the music data.

Once the pre-fetch data is prioritized, the pre-fetch data can be downloaded in priority order (block 612). In the example above, the mapping data may be downloaded prior to downloading music data. This may help ensure that all of the more essential data is downloaded prior to the start of the dead zone.

In some embodiments, other mitigation tasks could be used. For example, less granular data (e.g., lower resolution data) could be downloaded as pre-fetch data, when there is not enough time to download all of the pre-fetch data. For example, for mapping data, only roads of expected travel could be pre-fetched. For music, lower quality music content could be downloaded. Reducing the resolution of the pre-fetched data may reduce an amount of data to be pre-fetched, which may help download the pre-fetch data prior to entering the dead zone.

Figure 7:
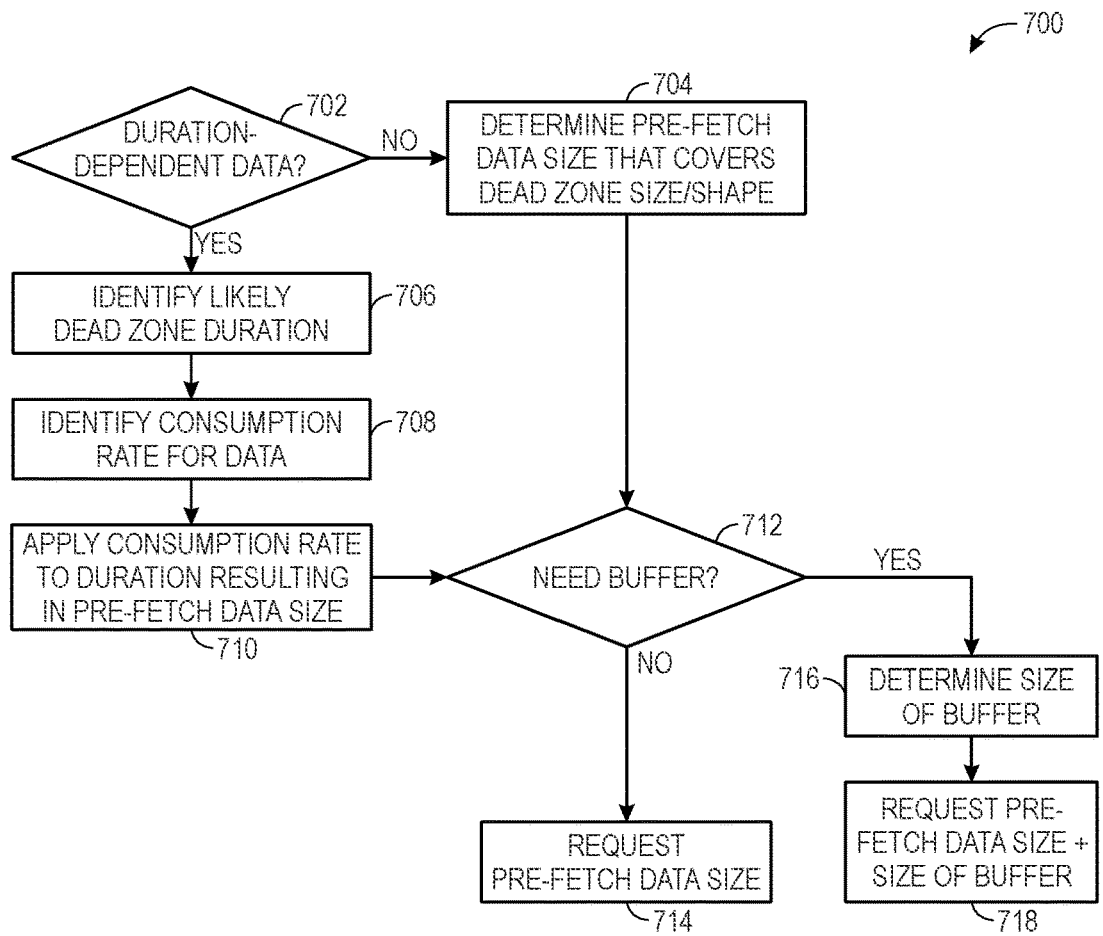
FIG. 7 is a flowchart, illustrating a process for pre-fetching varied sizes of data, in accordance with an embodiment of the present disclosure.

Turning now to a more-detailed discussion of sizing the amount of data to pre-fetch, FIG. 7 is a flowchart, illustrating a process 700 for pre-fetching varied sizes of data, in accordance with an embodiment of the present disclosure. The process 700 begins by deciding whether the data to pre-fetch is duration-dependent (decision block 702). As mentioned above, for some data, an amount of the data used in the dead zone may depend on an amount of time within the dead zone. This type of data is dead-zone-duration-dependent data. A list of different types of data and whether they are dead-zone-duration-dependent may be pre-defined and supplied to the pre-fetch circuitry to make this determination for different types of data that it receives.

If the data that is received is not dead-zone-duration-dependent, a pre-fetch data size is determined based upon the data covering the dead zone size and/or shape (block 704). For example, mapping data that covers the dead zone may be identified and set as the pre-fetch data size.

If the data is dead-zone-dependent data, a duration of time that the electronic device will likely be in the dead zone is identified (block 706). The likely duration may be identified based upon a number of factors. For example, in some embodiments, the duration may be based upon previous reported durations of the electronic device or other electronic devices. In some embodiments, the likely duration may be based upon the rate of speed of travel towards the dead zone.

The consumption rate for the data is also identified (block 708). For example, a periodic historical average of data consumption may tend to suggest a consumption rate going forward.

The consumption rate may be applied to the duration, resulting in a pre-fetch data size (block 710). Once the pre-fetch data size is determined (e.g., in blocks 704 and/or 710), a determination may be made as to whether a buffer is desired (decision block 712). The buffer may help ensure data availability in the dead zone, even if data is consumed at a greater rate and/or there is additional time spent in the dead zone.

If no buffer is desired, the pre-fetch data size is used in a pre-fetch request (block 714). However, when a buffer is desired, the process 700 continues with determining a size of the buffer (block 716). This buffer size can vary based upon a number of factors. For example, in some embodiments, more essential data will have a buffer, while less essential data will not have a buffer. In some embodiments, more essential data will have a larger buffer, while less essential data will have a relatively smaller buffer. In some embodiments, the buffer size may vary based upon an amount of time available to pre-fetch data. In other words, a larger buffer may be requested when there is more time to pre-fetch content. In some embodiments the buffer will allow for additional data consumption after the dead zone is exited, but prior to re-establishment of a data stream. For example, even though the electronic device may re-enter an active coverage area, there may be some lag in re-establishing the connection to the data stream. The buffer size may factor in data stream establishment times to ensure that there is a smooth transition back to streaming service after re-establishing the data stream upon exiting the dead zone. The process 700 then continues by requesting the pre-fetch data size added to the size of the buffer (block 718).

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer-implemented method, comprising:
receiving, via a beacon signal of a beacon, an indication of an upcoming dead zone, wherein the beacon signal comprises a plurality of directional indications, the plurality of directional indications each indicating one or more of a plurality of upcoming dead zones;
identifying pre-fetch data to obtain for use within the upcoming dead zone;
determining that the pre-fetch data is dead zone duration dependent; and
in response to determining that the pre-fetch data is dead zone duration dependent:
identifying a likely dead zone duration;
identifying a historical consumption rate of data; and
calculating a pre-fetch data size based upon the historical consumption rate applied to the likely dead zone duration; and
requesting an amount of pre-fetch data based upon the pre-fetch data size.

2. The computer-implemented method of claim 1, wherein identifying a likely dead zone duration comprises identifying previous reported dead zone durations, identifying a rate of speed of travel towards the upcoming dead zone, or both.

3. The computer-implemented method of claim 1, comprising determining that a buffer is desired, and, in response to determining that the buffer is desired:
determining a buffer size; and
requesting pre-fetch data size and the buffer size.

4. The computer-implemented method of claim 1, comprising:
identifying, via pre-fetch circuitry, a travel vector; and
identifying, via the pre-fetch circuitry, the upcoming dead zone based on the travel vector.

5. The computer-implemented method of claim 1, comprising:

determining whether there is enough time to download the pre-fetch data;

in response to determining that there is enough time to download the pre-fetch data, download the pre-fetch data; and in response to determining that there is not enough time to download the pre-fetch data, perform a mitigation action, wherein the mitigation action comprises prioritizing a first type of data over a second type of data, reducing a granularity of the data to reduce an amount of the data to download, or both.

6. The computer-implemented method of claim 5, wherein the first type of data comprises mapping data and the second type of data comprises music data.

7. The computer-implemented method of claim 6, comprising reducing the granularity of the mapping data by pre-fetching data only for roads of expected travel.

8. The computer-implemented method of claim 1, comprising calculating the pre-fetch data size based on a type of data being streamed.

9. The computer-implemented method of claim 1, wherein the beacon comprises a multi-directional beacon.

10. An electronic device, comprising:

communications circuitry communicatively coupled to a data provider system over a network to obtain streaming data for completion of tasks;

circuitry configured to receive, via a beacon, a beacon signal indicating an upcoming dead zone and comprising a plurality of directional indications, the plurality of directional indications each indicating one or more of a plurality of upcoming dead zones; and pre-fetch circuitry configured to:
identify pre-fetch data to obtain for use within the upcoming dead zone;
determine that the pre-fetch data is dead zone duration dependent; and
in response to determining that the pre-fetch data is dead zone duration dependent:
identify a likely dead zone duration;
identify a historical consumption rate of data; and
calculate a pre-fetch data size based upon the historical consumption rate applied to the likely dead zone duration; and
request an amount of pre-fetch data based upon the pre-fetch data size.

11. The electronic device of claim 10, wherein the pre-fetch circuitry is configured to:
identify a travel vector of the electronic device; and
identify the upcoming dead zone based upon the travel vector.

12. The electronic device of claim 11, wherein the electronic device comprises a global positioning system (GPS) and where the travel vector is identified based upon the GPS system.

13. The electronic device of claim 10, wherein the beacon comprises a multi-directional beacon.

14. The electronic device of claim 10, wherein the beacon comprises a traffic light.

15. The electronic device of claim 14, wherein the beacon is configured to provide an indication of boundaries associated with the traffic light, wherein the boundaries comprise active zone boundaries, dead zone boundaries, or both.

16. A tangible, non-transitory, computer-readable medium, comprising computer-readable instructions that, when executed by one or more processors of a computer, cause the computer to:

receive, via a beacon, a beacon signal, the beacon signal indicating an upcoming dead zone and comprising a plurality of directional indications, the plurality of directional indications each indicating one or more of a plurality of upcoming dead zones;

identify pre-fetch data to obtain for use within the upcoming dead zone;

determine that the pre-fetch data is dead zone duration dependent; and in response to determining that the pre-fetch data is dead zone duration dependent:
identify a likely dead zone duration;
identify a historical consumption rate of data; and
calculate a pre-fetch data size based upon the historical consumption rate applied to the likely dead zone duration; and
request an amount of pre-fetch data based upon the pre-fetch data size.

17. The tangible, non-transitory, computer-readable medium of claim 16, comprising computer-readable instructions that, when executed by the one or more processors of the computer, cause the computer to:
determine whether there is enough time to download the pre-fetch data; and
in response to determining that there is enough time, download the pre-fetch data.

18. The tangible, non-transitory, computer-readable medium of claim 16, comprising computer-readable instructions that, when executed by the one or more processors of the computer, cause the computer to:
determine when there is not enough time to download the pre-fetch data; and
in response to determining that there is not enough time, perform a mitigating action.

19. The tangible, non-transitory, computer-readable medium of claim 18, wherein the mitigating action comprises prioritizing a first type of data over a second type of data.

20. The tangible, non-transitory, computer-readable medium of claim 18, wherein the mitigating action comprises reducing a granularity of the data to reduce the amount of the pre-fetch data to download.

* * * * *